(12) United States Patent
Bosgieter et al.

(10) Patent No.: US 6,305,710 B1
(45) Date of Patent: Oct. 23, 2001

(54) INFLATABLE KNEE BOLSTER MODULE ASSEMBLY

(75) Inventors: Lance M. Bosgieter, Roy; Davin Saderholm, Salt Lake City, both of UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/511,724

(22) Filed: Feb. 24, 2000

(51) Int. Cl.[7] .................................................. B60R 21/04
(52) U.S. Cl. ..................... 280/753; 280/728.1; 280/751; 280/752
(58) Field of Search ..................... 280/753, 752, 280/751, 748, 730.1, 732, 728.3, 728.1

(56) References Cited

U.S. PATENT DOCUMENTS

| | | |
|---|---|---|
| 4,948,168 | 8/1990 | Adomeit et al. . |
| 5,435,594 | 7/1995 | Gille . |
| 5,536,043 | 7/1996 | Lang et al. . |
| 5,605,347 | 2/1997 | Karlow et al. . |
| 5,630,621 | 5/1997 | Schneider . |
| 5,775,729 | 7/1998 | Schneider et al. . |
| 5,782,488 | 7/1998 | Lewis et al. . |
| 5,876,061 | * 3/1999 | Stavermann .......................... 280/732 |
| 5,931,493 | 8/1999 | Sutherland . |
| 6,193,272 | * 2/2001 | Aigner et al. ..................... 280/730.1 |

* cited by examiner

Primary Examiner—Eric Culbreth
(74) Attorney, Agent, or Firm—Sally J. Brown; James D. Erickson

(57) ABSTRACT

Inflatable knee bolster module assemblies are provided wherein a knee bolster panel and an associated reaction plate engage to form a bolster housing containing an inflatable knee cushion and a knee cushion inflator assembly. Upon actuation, the knee cushion inflator assembly provides an inflation fluid effective to inflate the knee cushion and to deploy the knee bolster panel to provide lower torso restraint for an oppositely positioned vehicle occupant while the knee bolster panel remains engaged with the reaction plate.

17 Claims, 5 Drawing Sheets

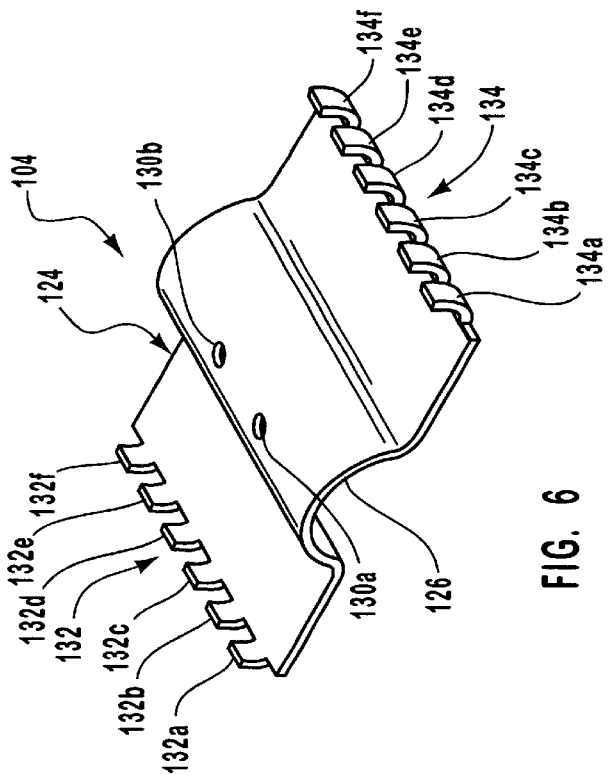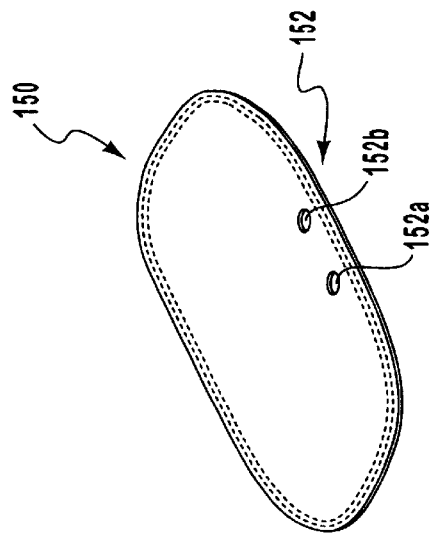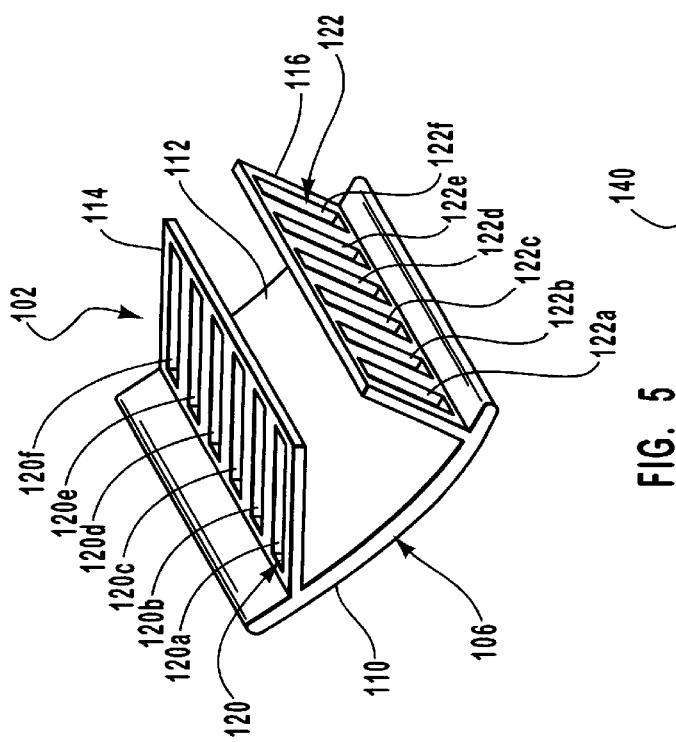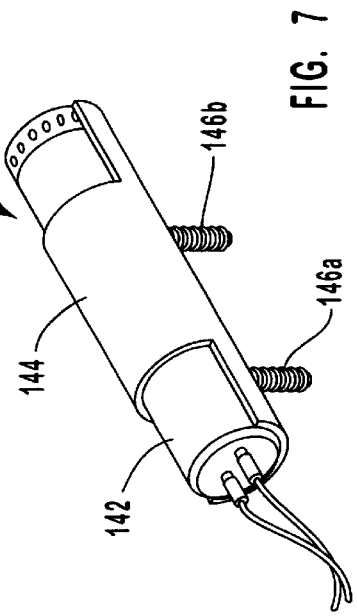

INFLATABLE KNEE BOLSTER MODULE ASSEMBLY

BACKGROUND OF THE INVENTION

This invention relates generally to automotive safety restraint assemblies and more particularly, to an improved inflatable knee bolster module assembly such as may be useful in automotive safety restraint systems.

It is well known to protect a vehicle occupant using inflatable restraint systems which incorporate a cushion or bag, e.g., an "airbag cushion," that is inflated or expanded with gas such as when the vehicle encounters a sudden deceleration, such as in the event of a collision. Such systems commonly comprise an inflatable airbag module stored behind the instrument panel of the vehicle. In such modules, the associated airbag cushion is normally housed in an uninflated and folded condition to minimize space requirements. Upon actuation of the system, such as in the event of a collision by the vehicle, the cushion begins to be inflated in a matter of no more than a few milliseconds with gas produced or supplied by a device commonly referred to as an "inflator." This causes the airbag cushion to be deployed as a protective cushion for occupants within the vehicle passenger compartment.

As installed behind the vehicle instrument panel, a folded airbag cushion and an associated inflator device are typically contained within a module assembly reaction canister, which canister is commonly provided with a generally rectangular cover. The cover also comprises the cover or door for an airbag deployment opening that is formed in a portion of the instrument panel.

Automotive vehicles provided with inflatable airbag cushion safety restraint devices have commonly been designed with a stationary panel, located on a downward and forwardly inclined portion of the instrument panel, which panel acts as a knee crush zone. The portion of the instrument panel enclosed in the knee crush zone is oftentimes classified or referred to as a "knee bolster." During a crash, momentum may cause an occupant to move forward such that the legs of the occupant contact the knee bolster. As a result, such knee bolsters can desirably prevent the occupant from submarining beneath the inflated airbag. With such contact, the knee bolster may desirably deform under the load such as to absorb energy and minimize the forces acting on the legs of the occupant.

The use of a crushable stationary panel on the instrument panel of an automotive vehicle to provide a knee crush zone or bolster can be disadvantageous in a number of respects. For example, such a construction can serve to reduce the distance between the knees of an occupant and the instrument panel. Such a reduction may detract from and diminish the amount of leg room and the feeling of roominess the occupant would prefer to retain.

As a result, there has been a need and a demand for improved knee bolster assemblies.

At least partially in response to such need. Airbag activated knee bolsters such as disclosed in commonly assigned Lang et al., U.S. Pat. No. 5,536,043, issued Jul. 16, 1996, and which patent disclosure is fully incorporated herein by reference, have been developed.

At least certain prior art inflatable knee bolster assemblies utilize retainer rings and a plurality of fasteners such as in the form of nuts, bolts or the like to attach the inflatable knee bolster cushion to either or both the associated knee bolster assembly module housing and the associated knee bolster panel or associated load distributor panel.

FIG. 1 illustrates a prior art knee bolster assembly, generally designated by the reference numeral 10 involving the attachment of a knee bag cushion 12 with an associated bolster panel 14 and an associated inflator 16, respectively.

With respect to the attachment of the knee bag cushion 12 with the bolster panel 14, the cushion 12 is secured between the bolster panel 14 and an associated bolster-side retainer plate or ring 20. In particular, the bolster panel 14 is provided with studs 22 which extend through the cushion 12 and through clearance holes 24 provided in the bolster-side retainer plate 20. Attachment nuts 26 are applied to the bolster panel studs 2, thereby clamping the cushion 12 between the bolster panel 14 and the bolster-side retainer ring 20.

With respect to the attachment of the knee bag cushion 12 with the inflator 16, the inflator 16 includes a circumferential attachment flange 30 to which is applied an annular reaction housing 32, also sometimes referred to as a "reaction plate." The cushion 12 is secured between the reaction plate 32 and an associated inflator-side retainer plate or ring 34 by means of rivets 36 or the like, such as is known in the art and such as may extend from the retainer ring 34. For examples the rivets 36 can be sequentially passed through the cushion 12, the reaction plate 32 and the inflator attachment flange 30 and then secured with associated attachment nuts 40.

As will be. appreciated, such attachment operations may be more difficult than desired as, for example, the bolster panel retainer plate 20 and the associated attachment nuts 26 are inside the cushion 12 and access to this interior region is through the relatively small inflator opening to the cushion. Further, the use of such multiple part fastening systems can be more complicated and costly than desired for efficient mass production.

FIG. 2 illustrates the assembly 10 of FIG. 1 after inflation of the cushion 12. As shown in FIG. 2, upon inflation of the cushion 12, large, generally triangular shaped voids 44 can occur or be formed between the cushion 12 and the bolster panel 14. As observed in previous tests, such an assembly can cause or result in undesired rotation of the bolster panel 14 relative to the retainer 20, for example, as signified by the arrows 46. As a result, the assembly 10 may experience or exhibit greater than desired instability.

Commonly assigned Schneider, U.S. Pat. No. 5,630,621, the disclosure of which is fully incorporated herein by reference, discloses a knee bolster assembly which advantageously overcomes at least some of the shortcomings or limitations of such earlier knee bolster assembly designs. In particular, this patent discloses a knee bolster assembly which advantageously eliminates the need for a bolster-side retainer and associated fasteners for attaching a bolster cushion to an associated bolster panel. In particular, it discloses attaching a bolster cushion to an associated bolster panel via the use of a rod and channel design. Further, as disclosed, such a knee bolster assembly can advantageously prevent the creation of undesirable voids which reduce assembly stability.

There is, however, a continuing need and demand for further improved inflatable knee bolster module assemblies. In particular, there is a need and a demand for improved inflatable knee bolster module assemblies such as may desirably accomplish or achieve one or more of the following objectives: simplify assembly and construction. reduce or minimize the costs associated therewith and increase assembly performance.

SUMMARY OF THE INVENTION

A general object of the invention is to provide an improved inflatable knee bolster module assembly.

A more specific objective of the invention is to overcome one or more of the problems described above.

The general object of the invention can be attained, at least in part, in an inflatable restraint system for an automotive vehicle. The automotive vehicle includes at least one primary inflatable cushion and a corresponding primary inflator assembly to provide an inflation fluid to inflate the primary inflatable cushion to restrain forward movement of an oppositely positioned vehicle occupant. The automotive vehicle also includes an inflatable knee bolster module assembly which includes a knee bolster panel, an associated inflatable knee cushion and a corresponding knee cushion inflator assembly distinct from the primary inflator assembly and effective to provide an inflation fluid to inflate the inflatable knee cushion to position the knee bolster panel to provide lower torso restraint for the oppositely positioned vehicle occupant.

In accordance with one preferred embodiment of the invention the invention provides an improvement of the inflatable knee bolster module assembly including the knee bolster panel having a generally planar face portion. The knee bolster panel also includes first and second spaced apart attachment flanges, each of which extends rearwardly from the face portion. The inflatable knee bolster module assembly also includes a reaction plate having first and second spaced apart attachment extensions corresponding to the first and second spaced apart attachment flanges, respectively. The knee bolster panel is adapted to cooperate with the reaction plate to form a housing for the knee cushion inflator assembly and the inflatable knee cushion in a stored condition and wherein, upon deployment of the inflatable knee cushion, the knee bolster panel face portion is displaced to provide lower torso restraint for the oppositely positioned vehicle occupant while the knee bolster panel remains engaged with the reaction plate.

The prior art generally fails to provide inflatable knee bolster module assemblies which have or provide a desired simplicity in assembly and construction, and which desirably increase assembly performance while reducing or minimizing the costs associated therewith.

The invention further comprehends an inflatable knee bolster module assembly which includes a knee bolster panel, a reaction plate, an inflatable knee cushion and a knee cushion inflator assembly. In accordance with one preferred embodiment of the invention, the knee bolster panel includes a generally planar face portion and the reaction plate is adapted to engage with the knee bolster panel to form a bolster housing. The inflatable knee cushion is stored in an uninflated condition in the bolster housing. The knee cushion inflator assembly is also stored in the bolster housing, and is actuatable to provide an inflation fluid effective to inflate the knee cushion and deploy the knee bolster panel to provide lower torso restraint for an oppositely positioned vehicle occupant while the knee bolster panel remains engaged with the reaction plate.

In accordance with another preferred embodiment of the invention, the knee bolster panel, in addition to a generally planar face portion, also includes first and second spaced apart attachment flanges extending rearwardly from the face portion. The first attachment flange includes at least one first attachment slot opening and the second attachment flange includes at least one second attachment slot opening. The reaction plate includes a generally planar section and has at least first and second oppositely disposed attachment extensions. The first attachment extension includes at least one first attachment projection generally corresponding to the first attachment slot opening of the first attachment flange. The second attachment extension similarly includes at least one second attachment projection generally corresponding to the second attachment slot opening of the second attachment flange.

In the assembly, the first attachment projection is engageable with the first attachment slot opening and the second attachment projection is engageable with the second attachment slot opening to form a bolster housing. The inflatable knee cushion is stored in an uninflated condition in the bolster housing. The knee cushion inflator assembly is also stored in the bolster housing and is actuatable to provide an inflation fluid effective to inflate the knee cushion and deploy the knee bolster panel to provide lower torso restraint for an oppositely positioned vehicle occupant while the first attachment projection remains engaged with the first attachment slot opening and the second attachment projection remains engaged with the second attachment slot opening.

Other objects and advantages will be apparent to those skilled in the art from the following detailed description taken in conjunction with the appended claims and drawings.

BRIEF DESCRIPTION OF THE DRAWINGS

FIG. 3A is a simplified schematic of a vehicular inflatable restraint system installation in accordance with one embodiment of the invention.

FIG. 5 is a simplified perspective schematic of the knee bolster panel of the inflatable knee bolster module assembly shown in FIG. 3.

FIG. 6 is a simplified perspective schematic of the reaction plate of the inflatable knee bolster module assembly shown in FIG. 3.

FIG. 7 is a simplified perspective schematic of the inflator and associated inflator housing of the inflatable knee bolster module assembly shown in FIG. 3.

FIG. 8 is a simplified perspective schematic of the inflatable knee cushion of the inflatable knee bolster module assembly shown in FIG. 3.

DETAILED DESCRIPTION OF THE INVENTION

Figure 2:
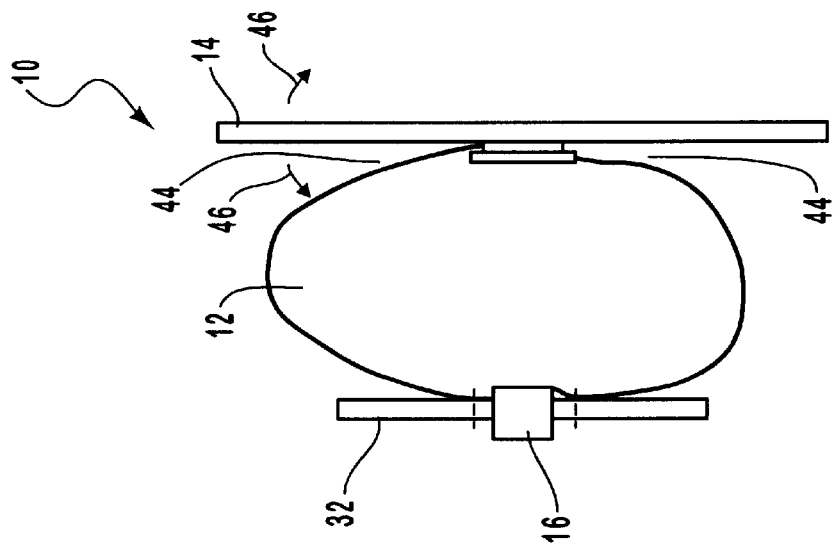
FIG. 2 is a schematic of the inflatable knee bolster module assembly shown in FIG. 1 in a deployed state or condition.
Figure 1:
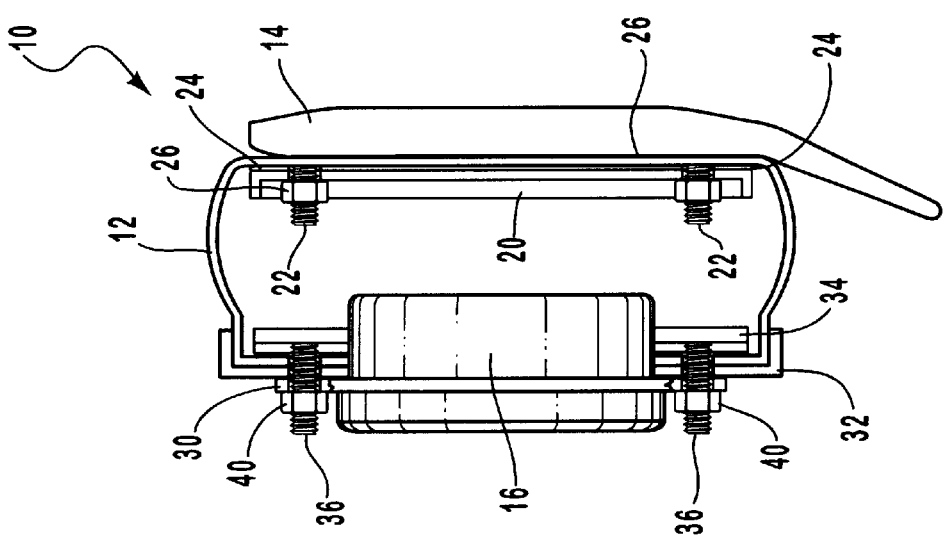
FIG. 1 is a schematic view, partially in section, of an inflatable knee bolster module assembly in accordance with one prior art embodiment.
Figure 4:
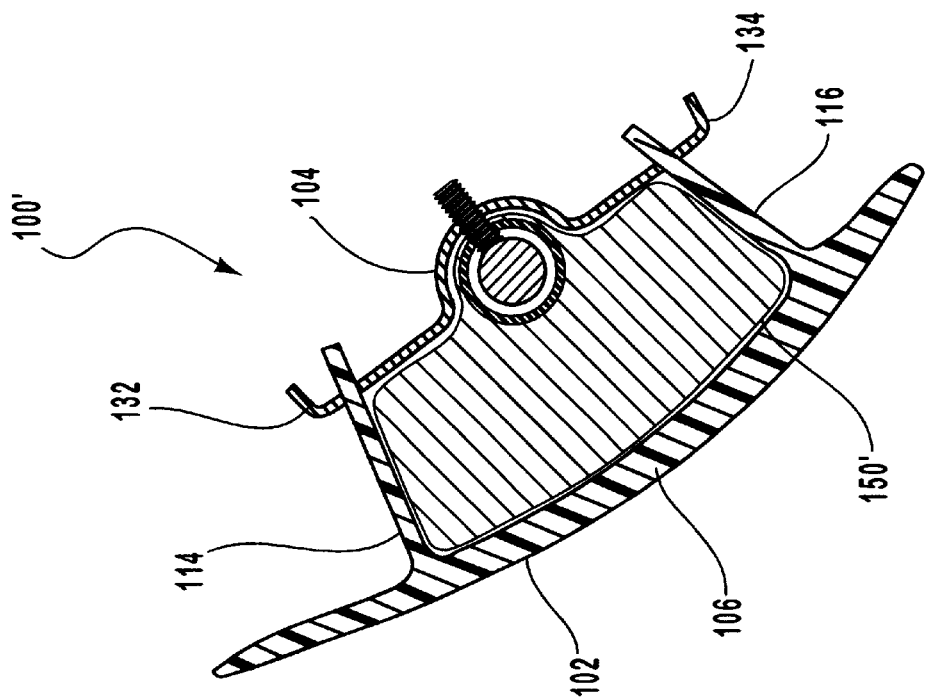
FIG. 4 is a simplified cross sectional schematic of the inflatable knee bolster module assembly shown in FIG. 3 but now in a deployed state or condition.
Figure 3:
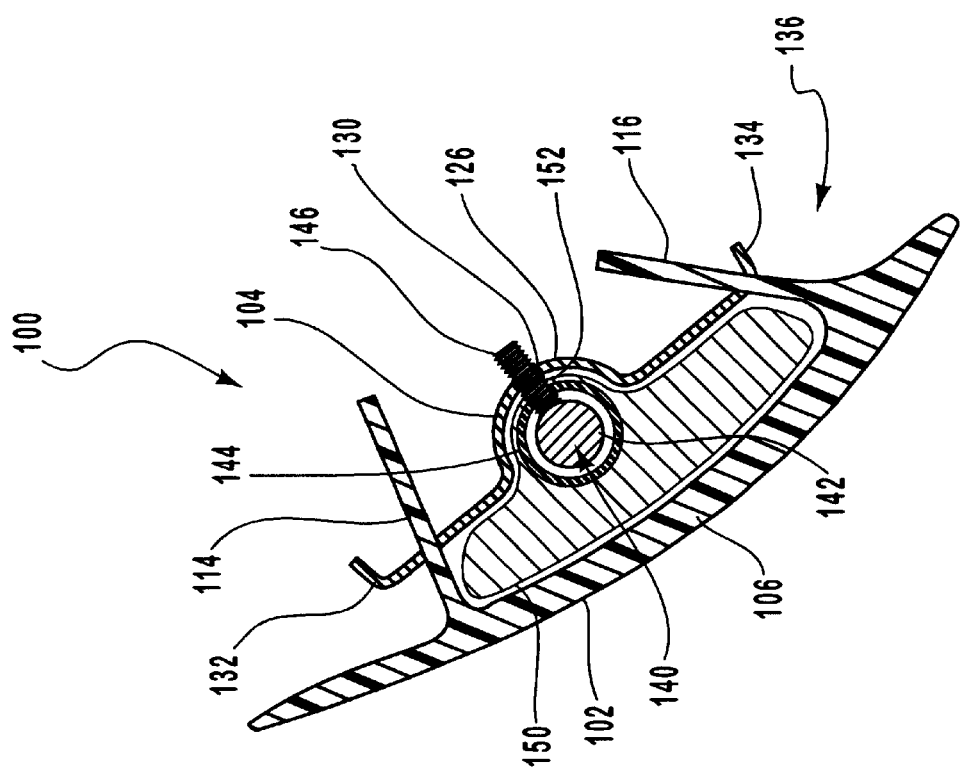
FIG. 3 is a simplified cross sectional schematic of an inflatable knee bolster module assembly, in accordance with one embodiment of the invention, in a static state.

The present invention, as is described in more detail below, provides an improved inflatable knee bolster module assembly. The present invention may be embodied in a variety of different structures. As representative, FIG. 3 illustrates an inflatable knee bolster module assembly, generally designated by the reference numeral 100, in accordance with one preferred embodiment of the invention. As shown in FIG. 3, the inflatable knee bolster module assembly 100 is in a static or undeployed state or condition. FIG. 4 illustrates the same inflatable knee bolster module assembly, here generally designated by the reference character 100', but now in a deployed state or condition.

As will be appreciated and as shown in FIG. 3A for the vehicular inflatable restraint system installation 300, such an inflatable knee bolster module assembly 100 is desirably supplemental or in addition to one or more primary inflatable cushions 302 and corresponding one or more primary inflator assemblies 304, such as have come to be employed for the supplemental restraint of the forward movement of an oppositely positioned vehicle occupant. The inflatable knee bolster module assembly 100 includes a knee bolster panel 102 and a reaction housing or plate 104. The knee bolster panel 102, as shown in greater detail in FIG. 5, includes a generally planar face portion 106 having a forward facing side 110 and a rearward facing side 112. The knee bolster panel 102 also includes first and second spaced apart attachment flanges 114 and 116, respectively, extending from the bolster panel rearward facing side 112. As shown, the first attachment flange 114 includes a first series of spaced apart attachment slot openings 120. The individual slot openings of the first series 120 are individually designated by the reference characters 120(a–f). Similarly, the second attachment flange 116 includes a second series of spaced apart attachment slot openings 122. The individual slot openings of the second series 122 are similarly individually designated by the reference characters 122(a–f).

The reaction plate 104, as shown in greater detail in FIG. 6, includes a generally planar section 124. The generally planar reaction plate section 124 may, if desired and as shown, include a concave region or portion 126 and have one or more attachment openings 130 (here individually designated 130a and 130b, respectively) extending therethrough such as to facilitate the joining or attachment therewith of an appropriate inflator device, as described in greater detail below.

The reaction plate 104 also includes a first series of attachment extensions 132 generally corresponding to the first series of the spaced apart attachment slot openings 120. The attachment extensions of the first series 132 are generally in the form of projections, individually designated by the reference characters 132(a–f), respectively. The reaction plate 104 also includes a second series of attachment extensions 134 generally corresponding to the second series of the spaced apart attachment slot openings 122. The attachment extensions of the second series 134 are similarly generally in the form of projections individually designated by the reference character 134(a–f), respectively.

While the invention has been described above relative to a specific inflatable knee bolster module assembly embodiment which includes first and second series of attachment slot openings 120 and 122, respectively, and first and second series of attachment extensions 132 and 134, respectively, wherein each such series includes seven (7) specific members, it will be understood that the broader practice of the invention is not necessarily so limited as series with a greater or lesser number of members may, if desired, be used. Further, either or both the number and spacing of members of the first and second series of attachment slot openings 120 and 122, respectively, and first and second series of attachment extensions 132 and 134, respectively, can be varied or selected, such as in a manner known to those skilled in the art, to ensure proper and desired orientation of orientation specific components upon the incorporation thereof into a particular assembly. For example, a particular module assembly may include a knee bolster panel having a face portion designed for specific placement and location within the vehicle interior, such as a specific orientation within the vehicle dashboard. In accordance with the invention, the utilization of a different number and/or spacing of slot openings and corresponding attachment extensions can serve to ensure that knee bolster panel is incorporated into an assembly with such a proper or otherwise desired orientation.

Returning to FIG. 3 and as described in greater detail below, the attachment slot openings and corresponding attachment extensions are used in accordance with the invention to join the knee bolster panel 102 together with the reaction plate 104 to form a bolster housing 136. Within the bolster housing 136, there is contained or stored a knee cushion inflator assembly, here designated by the reference numeral 140, and shown in greater detail in FIG. 7. While inflator assemblies of various constructions or designs may be used in the practice of the invention, the knee cushion inflator assembly 140 includes an elongated tubular inflator 142 such as of known construction and an associated tubular housing 144 therefor.

As shown in FIG. 3, the knee cushion inflator assembly 140 can desirably be designed to couple or otherwise appropriately fit with the reaction plate 104, such as with the concave region or portion 126 thereof. Further, the tubular housing 144 may also desirably include one or more perpendicularly extending attachment studs 146. As shown in FIG. 7, the tubular housing 144 includes attachment studs, here individually designated 146a and 146b, respectively, such as to facilitate the attachment or fastening thereof into the knee bolster module assembly 100. More particularly, the attachment studs 146a and 146b, are passed through the respective corresponding reaction plate attachment openings 130a and 130b. In accordance with a preferred embodiment of the invention and as shown, the knee cushion inflator assembly 140 is desirably isolated or otherwise separated or distinct from and inflatable restraint system primary inflator assembly (not shown), such as used for the inflation of an associated or corresponding primary inflatable cushion such as commonly utilized to restrain forward movement of an oppositely positioned vehicle occupant.

As shown in FIG. 3, the bolster housing 136 also stores or contains therewithin an inflatable knee cushion 150. As will be appreciated by those skilled in the art and guided by the teachings herein provided, the inflatable knee cushion 150 desirably is stored or contained within the bolster housing 136, which in a static state or condition, is desirably in an uninflated and, preferably, an appropriately folded or otherwise desirably compacted form or condition such as to minimize the space requirements associated therewith. The inflatable knee cushion 150 may, as shown in greater detail in FIG. 8, include one or more attachment apertures 152 (here individually designated by the reference characters 152a and 152b respectively), to otherwise permit or facilitate the attachment of the inflatable knee cushion 150 within an corresponding inflatable knee bolster module assembly, in a manner such as known in the art. In particular, as shown in FIG. 3, such attachment can be effected by passing the attachment stud 146 through an associated cushion attachment aperture 152 and then through the associated reaction plate attachment opening 130 such as to trap or otherwise secure the inflatable knee cushion 150 between the inflator assembly 140 and the reaction plate 104.

As will be appreciated, such an inflatable knee bolster module assembly 100 may be appropriately joined, attached or otherwise connected in or to a respective automotive vehicle in a manner such as known in the art. For example, one or more of the attachment studs 146 can be passed through a corresponding opening provided in an associated vehicle component (not shown) and then secured with a nut or the like (also not shown) applied to the stud 146. It is to be understood, however, that various forms knee bolster module assembly attachment within a vehicle can be used and thus the broader practice of the invention is not necessarily limited by or to the specific form of attachment employed for attaching a knee bolster module assembly in accordance with the invention to or in a corresponding vehicle.

Upon activation of the inflatable knee bolster module assembly 100 the inflator device 142 is activated to provide or supply a quantity of inflation fluid, e.g. inflation gas, to the inflatable knee cushion 150. As a result and as shown in FIG. 4, the inflatable knee cushion, now designated by the reference numeral 150', is inflated to result in the deployment thereof. Such inflation and deployment causes or otherwise desirably results in the forward projection or displacement of the face portion 106 of the knee bolster panel 102 towards an oppositely positioned vehicle occupant (not shown) or such as to otherwise desirably provide lower torso restraint for such vehicle occupants. As described in greater detail below, upon such cushion deployment and knee bolster displacement, the knee bolster panel 102 desirably remains engaged with the reaction plate 104.

Figure 9:
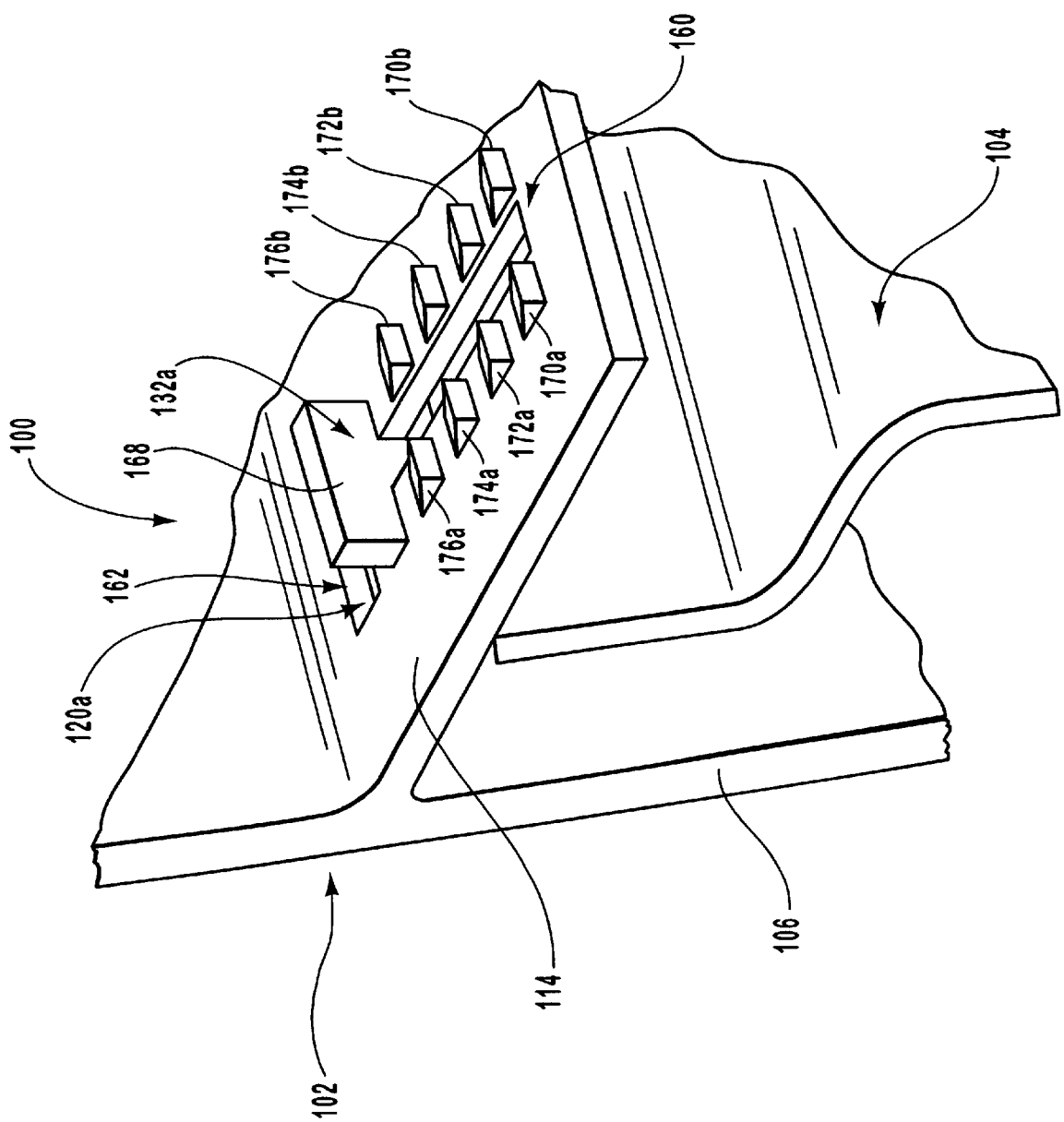
FIG. 9 is an enlarged fragmentary perspective view of the joining together of the knee bolster panel and the reaction plate of the inflatable knee bolster module assembly shown in FIG. 3.

Turning to FIG. 9, the joining together of the knee bolster panel 102 and the reaction plate 104 of the inflatable knee bolster module assembly 100 of FIG. 3, is shown in greater detail. More specifically, the knee bolster panel attachment slot opening 120a, in the first attachment flange 114, is shown in the general form of a "T-shaped" opening, including an elongated narrow slot portion 160 and, generally extending relatively perpendicular thereto, a widened slot portion 162. The reaction plate attachment extension 132a is shown as having a generally corresponding form such as includes a neck portion 166 and an end flange 168. As shown, the end flange 168 is desirably sized and shaped to permit the passage thereof through the widened slot portion 162 of the bolster panel attachment slot opening 120a.

The knee bolster panel 102 may desirably and as shown include a series of wedge projection pairs 170a and 170b; 172a and 172b; 174a and 174b; and 176a and 176b or the like locking features spaced along the opposite sides of the knee bolster panel attachment slot opening 120a, particularly along the opposite sides of the elongated narrow slot portion 160 thereof. As will be appreciated, such locking features may desirably cooperate with the associated reaction plate attachment extension 132a in a ratcheting, locking or the like manner such as to desirably secure or otherwise maintain the desired deployed positioning of the reaction plate attachment extension 132a within the associated knee bolster panel attachment slot opening 120a. For example, adaptive inflation assemblies may be incorporated within the inflatable knee bolster module assembly 100 such that the extent or degree of desired deployment of the knee bolster displacement can appropriately correspond to the specifics of the particular event or incident of deployment.

As shown in FIG. 4, assembly actuation and, more particularly, deployment of the associated inflatable knee cushion 150' causes or otherwise desirably results in the forward projection or displacement of the face portion 106 of the knee bolster panel 102 towards an oppositely positioned vehicle occupant or such as to otherwise desirably provide lower torso restraint for such vehicle occupants. In accordance with the invention, the knee bolster panel 102 desirably remains engaged with the reaction plate 104 upon such cushion deployment and knee bolster displacement. In particular, such inflatable knee cushion deployment causes or otherwise results in the displacement or separation of the knee bolster panel 102 relative to the reaction plate 104. For example, referring to FIG. 9, such displacement or separation can be realized as the attachment extension 132a remains engaged with the attachment flange 114 and, more particularly, in the attachment slot opening 120a but further rearward from the face portion 106 thereof. Returning to FIG. 4. the further rearward positioning or placement of the reaction plate 104 and the attachment extensions 132 and 134 thereof relative to the knee bolster panel 102, upon deployment of the inflatable knee cushion 150' can be more readily appreciated.

Alternatively or in addition, the inclusion of such wedge projections or other locking or the like features in inflatable knee bolster module assemblies may, in accordance with alternative embodiments of the invention, function or otherwise serve to lock or otherwise prevent the deployed knee bolster panel from undesirably moving upon contact by an oppositely seated occupant. For example, through the inclusion and use of such locking or the like feature, the housing assembly of the inflatable knee bolster module assembly may desirably be utiltized in absorbing at least a portion of any load applied thereagainst in the event of a vehicle collision. As will be appreciated, such utilization of the assembly to absorb impact loads can desirably reduce either or both the design and performance requirements of the associated inflatable knee cushion. As will further be appreciated, such locking features can, if desired, be designed to provide a preselected amount or extent of give upon contact. For example, particular such locking features can be appropriately designed to shear, break away or otherwise yield upon application of a predetermined pressure thereagainst.

Figure 10:
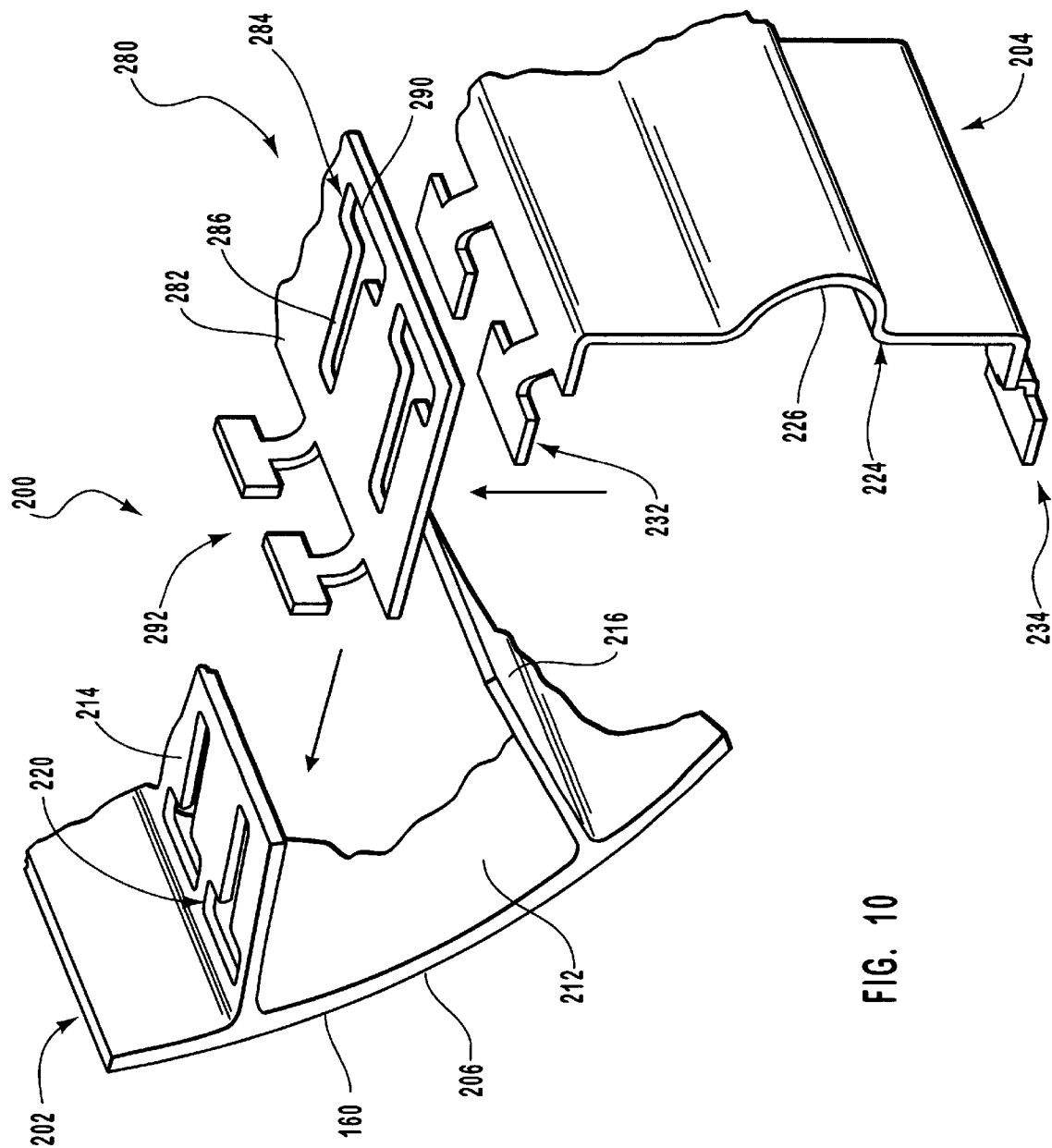
FIG. 10 is an enlarged exploded fragmentary perspective view of the joining together of a knee bolster panel and a reaction plate of an inflatable knee bolster module assembly in accordance with another preferred embodiment of the invention.

An inflatable knee bolster module assembly, generally designated by the reference numeral 200, in accordance with another preferred embodiment of the invention is shown in FIG. 10. The inflatable knee bolster module assembly 200, similar to the inflatable knee bolster module assembly 100 described above, includes a knee bolster panel 202 and a reaction housing or plate 204.

The knee bolster panel 202, similar to the knee bolster panel 102 described above, includes a generally planar face portion 206 having a forward facing side 210 and a rearward facing side 212. The knee bolster panel 202 also similarly includes first and second spaced apart attachment flanges 214 and 216, respectively, extending from the rearward facing side 212 thereof. The first and second attachment flanges 214 and 216, respectively, each includes a series of associated spaced apart attachment slot openings, similar to the slot openings 120 in the module assembly 100 described above. These attachment slot openings, as shown relative to the first attachment flange 214, are designated by the reference numeral 220. The reaction plate 204, similar to the reaction plate 104 described above, includes a generally planar section 224 such as shaped or formed to include a concave region or portion 226 such as to facilitate the joining or attachment therewith of an appropriate inflator device, such as described above. The reaction plate 204 also similarly includes a first and a second series of attachment extensions 232 and 234, respectively.

Certain features or components generally common between the inflatable knee bolster module assembly 200 and the inflatable knee bolster module assembly 100, described above, such as including a knee cushion inflator assembly, an inflatable knee cushion and the attachment or connection thereof within the respective module assembly, have not here been shown to facilitate illustration.

The inflatable knee bolster module assembly 200 primarily differs from the inflatable knee bolster module assembly 100 described above by the inclusion of an extension element, designated by the reference numeral 280, joining the knee bolster panel 202 and specifically the first attachment flange 214 thereof with the reaction plate 204. It will be appreciated that the inflatable knee bolster module assembly 200 will preferably also include a similar corresponding extension element (not shown) for the joining of the second bolster panel attachment flange 216 relative to the reaction plate 204.

The extension element 280 includes a generally planar portion 282 wherein a series of element slot openings 284 appear or are present. The extension element slot openings 284 are shown in the general form of a "T-shaped" opening, including an elongated narrow slot portion 286 and, generally perpendicularly extending relative thereto, a widened slot portion 290, such as similar to the attachment slot openings 220 in the knee booster panel 202. The extension element slot openings 284 generally correspond to the first series of reaction plate attachment extensions 232. The extension element 280 also includes a series of attachment extensions 292 generally corresponding to the first series of the spaced apart bolster panel attachment slot openings 220.

As shown in FIG. 10, extension element attachment extensions 292 are each desirably adapted to permit the passage thereof through a corresponding one of the bolster panel attachment slot openings 220. Similarly, the reaction plate attachment extensions 232 are each desirably adapted to permit the passage thereof through a corresponding one of the extension element attachment slot openings 284.

It is to be understood that although the module assembly inclusion and use of such extension elements may increase cost and complexity of assembly, through such inclusion and use the extent to which the associated knee bolster panel can be extended towards an oppositely positioned occupant can desirably be increased. Further, through the inclusion and use of such extension elements, the depth of the module assembly, such as measured from the front of the knee bolster panel to the back of the reaction plate, can be desirably reduced or otherwise minimized such as to reduce or minimize the size of the envelope required for placement of the module assembly within a vehicle such as in the dashboard thereof.

Further, while the extension element attachment extensions 292 and extension element slot openings 284 are shown as being generally similar to the reaction plate attachment extensions 232 and 234 and the attachment flange attachment slot openings 220, respectively, for example, it is to be understood that the broader practice of the invention is not necessarily so limited. For example, either or both appropriately differently shaped or sized attachment extensions and slot openings can, as may be desired, be used in the practice of the invention.

Thus, the invention provides improved inflatable knee bolster module assemblies which desirably provide or achieve one or more of the following objectives: simplify assembly and constriction, reduce or minimize the costs associated therewith and increase assembly performance.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflatable restraint system for an automotive vehicle and which automotive vehicle includes at least one primary inflatable cushion and a corresponding primary inflator assembly to provide an inflation fluid to inflate the primary inflatable cushion to restrain forward movement of an oppositely positioned vehicle occupant and an inflatable knee bolster module assembly which includes a knee bolster panel, an associated inflatable knee cushion and a corresponding knee cushion inflator assembly distinct from the primary inflator assembly and effective to provide an inflation fluid to inflate the inflatable knee cushion to position the knee bolster panel to provide lower torso restraint for the oppositely positioned vehicle occupant, the improvement of the inflatable knee bolster module assembly comprising:

the knee bolster panel including a generally planar face portion and first and second spaced apart attachment flanges, the first and second attachment flanges each rearwardly extending from the face portion and a reaction plate including first and second spaced apart attachment extensions corresponding to the first and second spaced apart attachment flanges, respectively, with the knee bolster panel adapted to cooperate with the reaction plate to form a housing for the knee cushion inflator assembly and the inflatable knee cushion in a stored condition and wherein, upon deployment of the inflatable knee cushion, the knee bolster panel face portion is displaced to provide lower torso restraint for the oppositely positioned vehicle occupant while the knee bolster panel remains engaged with the reaction plate.

2. The improved inflatable knee bolster module assembly of claim 1 wherein at least the first attachment flange includes at least one first attachment slot opening and wherein the first attachment extension includes at least one first attachment projection generally corresponding to the at least one first attachment slot opening, wherein the at least one first attachment projection is engageable with the at least one first attachment slot opening.

3. The improved inflatable knee bolster module assembly of claim 2 additionally comprising at least one locking feature adapted to maintain engagement positioning of the at least one first attachment projection with the at least one first attachment slot opening upon deployment of the inflatable knee cushion.

4. The improved inflatable knee bolster module assembly of claim 3 wherein the at least one locking feature comprises at least a pair of wedge projections along opposite sides of the at least one first attachment slot opening.

5. The improved inflatable knee bolster module assembly of claim 4 comprising a plurality of pairs of wedge projections spaced apart along opposite sides of the at least one first attachment slot opening.

6. The improved inflatable knee bolster module assembly of claim 3 wherein the at least one locking feature is adapted to yield upon application of a predetermined pressure thereagainst.

7. The improved inflatable knee bolster module assembly of claim 2 wherein at least the first attachment flange includes a plurality of first attachment slot openings and wherein the second first attachment extension includes a plurality of first attachment projections respectively generally corresponding to the plurality of the first attachment slot openings, wherein each of the first attachment projections is engageable with a respective one of the first attachment slot openings.

8. The improved inflatable knee bolster module assembly of claim 2 wherein at least the second attachment flange additionally includes at least one second attachment slot opening and wherein the second attachment extension includes at least one second attachment projection generally corresponding to the at least one second attachment slot opening, wherein the at least one second attachment projection is engageable with the at least one second attachment slot opening.

9. The improved inflatable knee bolster module assembly of claim 8 wherein:

at least the first attachment flange includes a plurality of first attachment slot openings and wherein the second first attachment extension includes a plurality of first attachment projections respectively generally corresponding to the plurality of the first attachment slot openings, wherein each of the first attachment projections is engageable with a respective one of the first attachment slot openings and at least the second attachment flange includes a plurality of second attachment slot openings and wherein the second attachment extension includes a plurality of second attachment projections respectively generally corresponding to the plurality of the second attachment slot openings, wherein each of the second attachment projections is engageable with a respective one of the second attachment slot openings.

10. The improved inflatable knee bolster module assembly of claim 1 additionally comprising at least one first extension element joining the first attachment flange with the reaction plate.

11. The improved inflatable knee bolster module assembly of claim 1 wherein the reaction plate includes a generally planar section with a concave region adapted to receive the knee cushion inflator assembly.

12. An inflatable knee bolster module assembly comprising:

a knee bolster panel including a generally planar face portion;

a reaction plate adapted to engage with the knee bolster panel to form a bolster housing;

an inflatable knee cushion stored in an uninflated condition in the bolster housing; and a knee cushion inflator assembly also stored in the bolster housing and actuatable to provide an inflation fluid effective to inflate the knee cushion and deploy the knee bolster panel to provide lower torso restraint for an oppositely positioned vehicle occupant while the knee bolster panel remains engaged with the reaction plate, wherein the knee bolster panel also includes first and second spaced apart attachment flanges extending rearwardly from the face portion, the first attachment flange including at least one first attachment slot opening and the second attachment flange including at least one second attachment slot opening.

13. The inflatable knee bolster module assembly of claim 12 wherein the reaction plate includes a generally planar section and at least first and second oppositely disposed attachment projections generally corresponding to the first and second attachment slot openings of the first and second attachment flanges, respectively, wherein the first attachment projection is engageable with the first attachment slot opening and the second attachment projection is engageable with the second attachment slot opening to form the bolster housing.

14. An inflatable knee bolster module assembly comprising:

a knee bolster panel including a generally planar face portion and first and second spaced apart attachment flanges extending rearwardly from the face portion the first attachment flange including at least one first attachment slot opening and the second attachment flange including at least one second attachment slot opening;

a reaction plate including a generally planar section and having oppositely disposed first and second attachment extensions wherein the first attachment extension includes at least one first attachment projection generally corresponding to the first attachment slot opening of the first attachment flange and the second attachment extension includes at least one second attachment projection generally corresponding to the second attachment slot opening of the second attachment flange, wherein the first attachment projection is engageable with the first attachment slot opening and the second attachment projection is engageable with the second attachment slot opening to form a bolster housing;

an inflatable knee cushion stored in an uninflated condition in the bolster housing; and a knee cushion inflator assembly also stored in the bolster housing and actuatable to provide an inflation fluid effective to inflate the knee cushion and deploy the knee bolster panel to provide lower torso restraint for an oppositely positioned vehicle occupant while the first attachment projection remains enraged with the first attachment slot opening and the second attachment projection remains engaged with the second attachment slot opening.

15. The inflatable knee bolster module assembly of claim 14 wherein the first attachment flange includes a plurality of spaced apart first attachment slot openings and the second attachment flange includes a plurality of spaced apart second attachment slot openings.

16. The inflatable knee bolster module assembly of claim 14 wherein the first attachment extension comprises a plurality of spaced apart first attachment projections.

17. The inflatable knee bolster module assembly of claim 16 wherein the second attachment extension comprises a plurality of spaced apart second attachment projections.

* * * * *